Aug. 3, 1954

C. M. LATHROP ET AL 2,685,685

PIPE LINE ALARM

Filed Dec. 23, 1952

Carl M. Lathrop
Christopher E. Loeser
By Peter H. Smolka

Inventors

Attorney

Patented Aug. 3, 1954

2,685,685

UNITED STATES PATENT OFFICE 2,685,685

PIPE LINE ALARM

Carl M. Lathrop, Westfield, and Christopher E. Loeser, Scotch Plains, N. J., assignors to Standard Oil Development Company, a corporation of Delaware Application December 23, 1952, Serial No. 327,514

5 Claims. (Cl. 340—282)

This invention relates to an improvement in pipelines used for conveying different fluids and particularly liquids such as oils of different quality. More specifically, the invention relates to a novel system for indicating the arrival of separating devices or go-devils which are used to separate two consecutive grades of oil.

When a series of oil stocks of different quality is pumped great distances through a pipeline, so-called go-devils or batching pigs are placed into the pipeline as each new batch or grade of oil is valved in. In this manner contamination by intermixing of consecutive batches is prevented. This is particularly important with large diameter pipelines wherein contamination of products by intermixing tends to be most serious.

To assure successful operation of such a system, an alarm is required which will notify the pipeline terminal that a go-devil is approaching. As a result of such an alarm, an operator or an automatic mechanism will manipulate valves so as to segregate one grade of oil from the next, by piping them into appropriate storage tanks or the like.

Heretofore such alarm systems have been customarily initiated by mechanical detection of the passage of the go-devil. For this purpose, mechanical feelers are attached to the inside of the pipe which, upon being passed by a go-devil at a given point, sets off a tripping mechanism which in turn sounds the alarm. However, the required levers and mechanical linkages seriously obstruct the flow of oil since they are mounted within the line. Further, these mechanical devices do not permit reverse operation of the line, and breaking off of the feelers may cause serious damage to pumps and other equipment.

Figure 1:
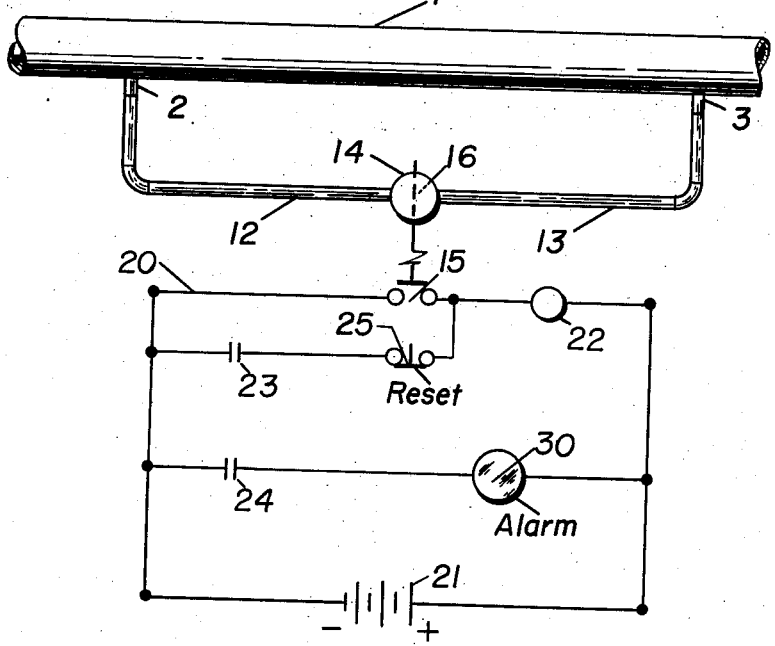
Figure 2:
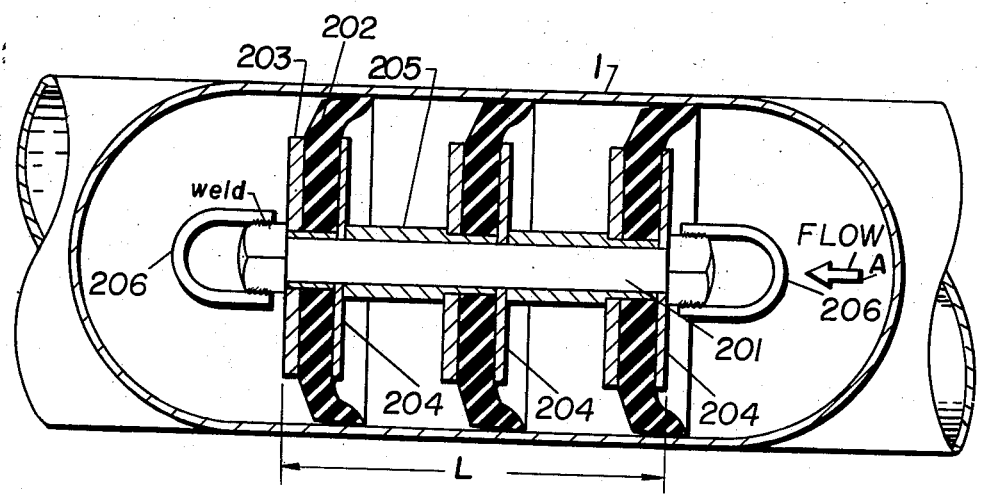

It is the object of the present invention to provide a more useful mechanism for detecting the passage of go-devils in pipelines. A more specific object is to provide a mechanism which does not obstruct the pipe and which is capable of functioning regardless of the direction of flow through the line. These and other objects, as well as the nature of the invention will become more clearly apparent from the following description and accompanying drawing wherein:

Fig. 1 diagrammatically illustrates a section of a pipeline containing the novel alarm mechanism; and Fig. 2 illustrates a typical go-devil used for separating consecutive grades of fluid.

Referring to Fig. 1, a portion of a pipeline 1 is shown, containing pressure taps 2 and 3. The taps may be separated from each other by a distance equal to about 2 to 5 times the length of the go-devil to be used in the line, or about 5 to 25 feet, preferably about 15 to 20 feet. The diameter of the pipeline may range from about ½ to 2½ feet. The normal pressure required in pumping various petroleum products such as gasoline or lubricating oil through such a line may range from about 50 up to about 200 pounds per square inch. Pumping rates normally may vary from about 200 to 5000 barrels per hour, depending principally on line diameter and viscosity of the fluid being pumped.

The pressure difference between taps 2 and 3 while pumping a liquid normally will be a fraction of a pound per square inch. However, when a go-devil enters between the two pressure taps, the pressure differential will suddenly increase to about 5 to 25 pounds per square inch which is the differential pressure required to move the go-devil. This pressure differential is transmitted hydraulically through connections 12 and 13 from the two pressure taps to a pressure differential responsive mechanism 14 which operates electrical control switch 15 in response to the exerted pressure differential.

Mechanism 14 may consist, for instance, of an enclosed diaphragm 16, opposite sides of which are connected to lines 12 and 13 respectively. Motion of the diaphragm results from the difference in pressure on opposite sides and is transmitted to the switch 15. Switch 15 is located in an electric circuit 20 which may conveniently contain a battery 21 or other suitable source of control power, a solenoid 22, contacts 23 and 24, a reset switch 25, and an electric horn or a signal light or other suitable signalling or control means 30. Thus, when switch 15 is closed by the pressure differential caused by passage of the go-devil between taps 2 and 3, the solenoid 22 becomes energized and closes contacts 23 and 24, thereby setting off the alarm or control 30. In this arrangement the solenoid 22 will stay energized, and hence the alarm 30 will stay in operation until the circuit is manually or automatically broken by operation of the reset switch 25.

However, it will be understood that other circuits may be used to set off a signal in response to the differential pressure in accordance with the present invention. For instance, it is possible to employ a simple circuit containing in series a battery, an electric horn and a control switch adapted to complete the circuit upon impulse from the pressure differential sensitive element. In such a case the alarm will be sounded only while the go-devil is passing between the two pressure taps. On the other hand, more complicated electrical circuits may similarly be employed, in which event device 30 may, for example, be a switching mechanism which will automatically operate suitable valves on the pipeline so as to pass consecutive batches of oil into appropriate branch lines, or eject the go-devil from the system, and so on. Furthermore, though usually not so convenient, the pressure differential responsive mechanism 16 may be connected to other than electrical signalling means. For example, mechanism 16 may operate directly to open a valve in an air line so as to blow an air whistle upon passage of the go-devil between the pressure taps.

Accordingly it will be understood that for the purposes of this invention the expression "signalling means" may refer both to acoustic or optical alarms which act purely as warning devices, and to operating control mechanisms such as valves or switches adapted for automatic action upon valves, pumps, servomotors or the like.

In Fig. 2 of the drawing a portion of a pipeline containing a typical go-devil or batching pig suitable for use in the present invention is shown in greater detail to facilitate a better understanding hereof. As is otherwise well known, it will be seen from Fig. 2 that the go-devil may consist essentially of a spacer shaft 201 and a plurality of disc-shaped elastic cups or so-called cup drivers 202 radially mounted on shaft 201 and serving to propel the go-devil in the direction of the fluid being moved through the pipeline 1 as indicated by the arrow A. When the transported fluid is oil, the cup drivers 202 are usually made of neoprene rubber or other oil resistant elastic polymer. The cup drivers 202 fit snugly into the pipeline 1 so as to effect a positive seal between the different batches of fluid which the go-devil is intended to separate. In general the rubber cup drivers 202 may be held in position by front plates 203 and back plates 204, the cup drivers being separated from each other by spacer bushings 205. The whole assembly may be held together by nuts with welded U-bars 206. The length L of the go-devil usually is of the order of about twice the internal diameter of the pipeline. However, go-devils of other known constructions are similarly usable in the present invention inasmuch as the specific go-devil has been shown herein simply by way of concrete example.

Of course, it will be understood that the entire foregoing description has been given principally for purposes of illustration rather than limitation. Accordingly, numerous variations and modifications of the invention may be made without departing from the scope and spirit thereof. For instance, while the invention has been principally described with reference to liquid petroleum products, it is similarly applicable to other liquids and even to gases. Likewise, pressure sensitive elements other than the ones specifically described may be used to actuate the audible or otherwise sensible alarm or operative control element. Also, electrical circuits and alarms or controls other than the ones shown may be used.

The invention is particularly pointed out in the following claims:

1. In combination with a pipeline adapted for conducting a series of different fluids separated from each other by an elongated slidable mechanical partition, the improvement which comprises a pair of pressure taps separated from each other on said pipeline by a distance equal to at least about twice the length of said elongated, slidable, mechanical partition, and signalling means responsive to substantial variations in pressure differential between said pressure taps, to indicate the passage of said go-devil between said taps.

2. In combination with a pipeline adapted for conducting a series of different fluids separated from each other by a go-devil, the improvement which comprises a pair of pressure taps separated from each other on said pipeline by a distance equal to about twice to five times the length of said go-devil, a differential pressure switch connected to said pressure taps and responsive to pressure differentials in excess of the normal line drop between the taps, and signalling means adapted to be actuated by operation of the said pressure switch.

3. An apparatus according to claim 2 wherein the distance between the pressure taps is about 15 to 25 feet.

4. An apparatus according to claim 2 wherein the signalling means includes an electric circuit which comprises a source of control power, a sensible alarm, and an electric switch responsive to operation of said pressure switch.

5. An apparatus according to claim 2 wherein the signalling means includes an electric circuit which comprises a source of control power, an electric switch responsive to operation of said pressure switch, an electrically operated sensible alarm, and a solenoid adapted to be energized by closure of the electric switch and adapted to set off the said electric alarm.

References Cited in the file of this patent

UNITED STATES PATENTS

| Number | Name | Date |
|---|---|---|
| 1,638,100 | Roucka | Aug. 9, 1927 |
| 2,570,951 | Hugo et al | Oct. 9, 1951 |
| 2,601,249 | Brenholdt | June 24, 1952 |